United States Patent
Hauf

(10) Patent No.: US 7,783,915 B2
(45) Date of Patent: Aug. 24, 2010

(54) AUTOMATION SYSTEM AND A METHOD AND INPUT/OUTPUT ASSEMBLY THEREFORE

(75) Inventor: Ronald Hauf, Möhrendorf (DE)

(73) Assignee: Siemens Aktiengesellschaft, München (DE)

( * ) Notice: Subject to any disclaimer, the term of this patent is extended or adjusted under 35 U.S.C. 154(b) by 783 days.

(21) Appl. No.: 11/572,245

(22) PCT Filed: Jul. 13, 2005

(86) PCT No.: PCT/EP2005/053343

§ 371 (c)(1),
(2), (4) Date: Jan. 17, 2007

(87) PCT Pub. No.: WO2006/008257

PCT Pub. Date: Jan. 26, 2006

(65) Prior Publication Data

US 2007/0255429 A1 Nov. 1, 2007

(30) Foreign Application Priority Data

Jul. 19, 2004 (DE) .................. 10 2004 034 862

(51) Int. Cl.
*G06F 11/00* (2006.01)

(52) U.S. Cl. .............. 714/5; 714/2; 714/24; 714/43; 714/56; 700/19; 710/11; 710/105; 710/107

(58) Field of Classification Search .......... 714/2, 714/3, 15, 24, 43, 56, 5; 700/19; 710/11, 710/105, 107
See application file for complete search history.

(56) References Cited

U.S. PATENT DOCUMENTS

| | | | | |
|---|---|---|---|---|
| 6,047,222 A * | 4/2000 | Burns et al. | ..................... | 714/2 |
| 6,532,508 B2 * | 3/2003 | Heckel et al. | ............... | 710/107 |
| 6,691,257 B1 * | 2/2004 | Suffin | .......................... | 714/43 |
| 6,826,433 B1 * | 11/2004 | Barthel et al. | .................. | 714/2 |
| 2005/0149207 A1 * | 7/2005 | Esch et al. | ..................... | 700/79 |

FOREIGN PATENT DOCUMENTS

| | | |
|---|---|---|
| DE | 197 42 716 A1 | 4/1999 |
| DE | 199 26 517 A1 | 1/2001 |
| WO | WO 01/14940 A | 3/2001 |

OTHER PUBLICATIONS

W. Gräf, Maschinensicherheit [*Machine Safety*], 3rd ed., Apr. 2004, pp. 106-109.

* cited by examiner

*Primary Examiner*—Robert Beausoliel
*Assistant Examiner*—Joseph D Manoskey
(74) *Attorney, Agent, or Firm*—Henry M. Feiereisen; Ursula B. Day

(57) ABSTRACT

Disclosed is an automation system (1) for executing safety-relevant automation functions. Said automation system (1) comprises one or several control componentries (10) and one or several input/output componentries (30, 30',50) that are connected thereto. The control componentry (10) is provided with standard program parts (11, 12) and fail-safe program parts (13, 14) to communicate with the connected input/output componentries (30, 30',50) via corresponding standard bus protocols (S) and fail-safe bus protocols (F). At least one of the input-output componentries (30) is controlled by both the standard program parts (11, 12) via the communicated standard bus protocol (S) and the fail-safe program parts (13, 14) via the communicated fail-safe bus protocol (F), said fail-safe bus protocol (F) having greater priority for said input/output componentry (30) than the standard bus protocol (S).

17 Claims, 4 Drawing Sheets

AUTOMATION SYSTEM AND A METHOD AND INPUT/OUTPUT ASSEMBLY THEREFORE

BACKGROUND OF THE INVENTION

The present invention relates to an automation system and to a method, and an input/output assembly for the automation system. In particular, the present invention relates to an input/output assembly for a safety-oriented automation system for performing safety-oriented automation.

To deal with desired automated nominal functions, automation systems require appropriate control and regulation of the assemblies involved in an automation process. In this case, what is known as a programmable logic controller (PLC) is usually used for control, said programmable logic controller using, by way of example, a field bus (such as the PROFIBUS, standardized in Germany through DIN 19245 and in Europe through EN 50170) to communicate with the assemblies connected to the field bus.

During operation of the automation system, appropriately standardized bus protocols are used to forward the control signals coming from the SPS to the assemblies stipulated beforehand in a configuration phase via the field bus or else to receive signals from other assemblies. The individual assemblies, such as output assemblies for connecting actuators, input assemblies for connecting sensors, or also assemblies which undertake locally determined terminated automation functions largely independently, are therefore combined to form an automation system which, during operation, executes the previously configured automation functions largely independently.

For safe operation of such automation systems, possible sources of danger need to be identified and need to be taken into account on the basis of stipulated standards and guidelines, as may be derived from the EU machine guideline (98/37/EG) or also from product liability laws, for example. For an error situation arising during operation, for example, it is thus necessary to ensure that the actuators involved, such as valves, are transferred to a safe state and hence further operation of the automation system is interrupted.

FIG. 1 illustrates a solution for an automation system 1 which is able to meet such safety-oriented requirements. In this case, a central controller 10 is connected to a plurality of output assemblies 30 by means of a field bus 20. The output assemblies 30 have the actuators, such as the valves 40 shown or else contactors etc, connected to them. A standard bus protocol S transmitted via the field bus 20 is used by the controller 10 to control this actuator system in line with the previously configured automation functions. The controller 10 may have standardized program parts 11 and 12 for this purpose. In this context, these "standard program parts" may be split into what are known as NC (Numeric Controller) and PLC (Programmable Logic Controller) program parts. In this case, NC program parts 11 are used essentially for movement guidance for the machine, whereas PLC program parts 12 are used essentially for logical processing of process signals via input/output assemblies.

There are various approaches for implementing the demanded safety-oriented automation functions. Thus, as FIG. 1 indicates, what is known as a failsafe controller could be introduced for safely controlling the automation system. In the case of failsafe controllers, safety-oriented program parts, known as "failsafe program parts" 13 and 14, and standard program parts 11 and 12 are executed beside one another in the PLC and NC of the control assembly 10. In this context, the safety-oriented program parts are distinguished essentially in that the routines which are fundamental to them are handled redundantly. The result of this is that during handling their cycle times are higher in comparison with routines from standard program parts. If the failsafe program parts now identify an error during execution of the automation functions then at least certain actuators need to be transferred to a safe state so as not to present a source of danger. Consequently, all automation functions, even those controlled by the standard program parts, would need to be controlled by means of these failsafe program parts for the safest possible operation. However, this would have the drawback that the whole automation process would be slowed down in a way which is usually not acceptable for the user.

To avoid such time delays, an approach as shown in FIG. 1 is therefore generally chosen. In this case, the active safety-oriented disconnection of particular actuators 40 takes place, without or even with interposition of the controller 10, through an appropriate sensor system 60, such as an emergency-stop command unit, a light grille or an overfill protection system. To this end, a peripheral assembly 50 is provided which has an interface module 51 for connection to the field bus 20, a power supply module 52, an input module 53 for connecting the emergency-stop command unit 60, and two load switching modules 54. Appropriate connections 70 between load switching modules 54 and output assemblies 30 are used to supply the actuators 40 connected to the output assembly with a suitable operating voltage from the power supply module 52. If the sensor, in this case the emergency-stop command unit 60, is now activated then the controller 10 in the load switching module 54 is used to disconnect the power supply for the output assembly 30 and hence also for the actuators 40 connected thereto (e.g.: F'=0V) and hence to transfer the actuators 40 to a safe state.

Accordingly, the peripheral assembly 50, which is connected to the controller by means of the interface module 51 via the field bus 20, can also react to failsafe program parts from the controller 10. If the failsafe program parts 13 or 14 now identify an error in the controller, for example, then the field bus 20 is used to route a "failsafe bus protocol" F to the peripheral assembly 50. In response to this, in the load switching module 54 the power supply for the output assembly 30 is also disconnected in this case, and the actuators connected thereto are transferred to the safe state.

In both cases, it is therefore assured that, regardless of whether the controller 10 continues to try to address and control this output assembly 30 using the standard bus protocol S, the actuators 40 for this output assembly remain disconnected and hence in a safe state.

However, such a safety-oriented automation system, as shown in FIG. 1, has the drawback that it has an involved, complex network topology. In particular, this comes from the fact that the paths for normal control and safety-oriented disconnection are separate from one another. In addition, in the case of the approach to a solution shown here, it is only ever possible to switch an entire output assembly and hence all the actuators connected thereto on a safety-oriented basis in an error situation, and not individual actuators selectively. If it is necessary to switch actuators with load currents of up to several amps, there is an additional requirement for expensive load switching modules for disconnecting the respective output assemblies.

It is therefore an object of the present invention to provide an input/output assembly and an appropriate automation system for performing safety-oriented automation functions which overcomes the aforementioned drawbacks.

SUMMARY OF THE INVENTION

In accordance with the present invention, this object is achieved by an input/output assembly for a safety-oriented automation system, with the safety-oriented automation system including at least one control assembly connected to the input/output assembly, wherein the control assembly has standard program parts and failsafe program parts in order to use appropriate standard bus protocols and failsafe bus protocols to communicate with connected input/output assemblies, wherein the input/output assembly can be controlled both by the standard program parts using the communicated standard bus protocol and by the failsafe program parts using the communicated failsafe bus protocol, and wherein for the input/output assembly the failsafe bus protocol has a higher priority than the standard bus protocol.

Particularly the fact that the inventive input/output assembly in the automation system is designed such that it can be controlled both by "standard program parts" using a "standard bus protocol" and by "failsafe program parts" using a "failsafe bus protocol" and for the input/output assembly the failsafe bus protocol has a higher priority than the standard bus protocol makes it possible to achieve a simpler network topology for a safety-oriented automation system. In addition, it is thus a very simple matter to introduce safety-oriented automation functions without fundamentally altering the cycle times at least for the routines from the standard program parts. Input/output assemblies can thus continue to be controlled by the standard program parts of the controller and to be disconnected by the failsafe program parts when needed without any additional delays in the cycle times.

The fact that the input/output assembly contains means for operating at least one actuator which can be connected to the input/output assembly, which means can be controlled, in the event of an error situation arising in the automation system, by the failsafe program part such that the connected actuators are transferred to a safe state and this safe state cannot be cancelled again by a standard bus protocol or even by the input/output assembly itself, ensures that the actuators can be activated again only by an enable signal from the safety-oriented program part. By way of example, this enable signal may be provided automatically or else manually, following a check, by service personnel.

Corresponding advantages are obtained for the inventive automation system for performing safety-oriented automation functions when at least one of the input/output assemblies is controlled both by the standard program parts using the communicated standard bus protocol and by the failsafe program parts using the communicated failsafe bus protocol, and where for this input/output assembly the failsafe bus protocol has a higher priority than the standard bus protocol.

Preferably, the input/output assembly is additionally provided with means for connecting actuators, which means have redundant connection pairs for connecting actuators (40), where the means for operating the at least one actuator respectively enable both connections from the redundant connection pairs in the arising error situation and only one connection from the redundant connection pairs in all other situations. This achieves additional safety.

According to a further advantageous feature of the invention, the input/output assembly may selectively transfer the actuator to a safe state. According to another feature of the invention, the input/output assembly may forward the signals arriving from a connected sensor to the control assembly.

BRIEF DESCRIPTION OF THE DRAWINGS

The invention and advantageous embodiments thereof are described in more detail below by way of example with reference to the figures which follow, in which.

DETAILED DESCRIPTION OF PREFERRED EMBODIMENTS

Figure 1:
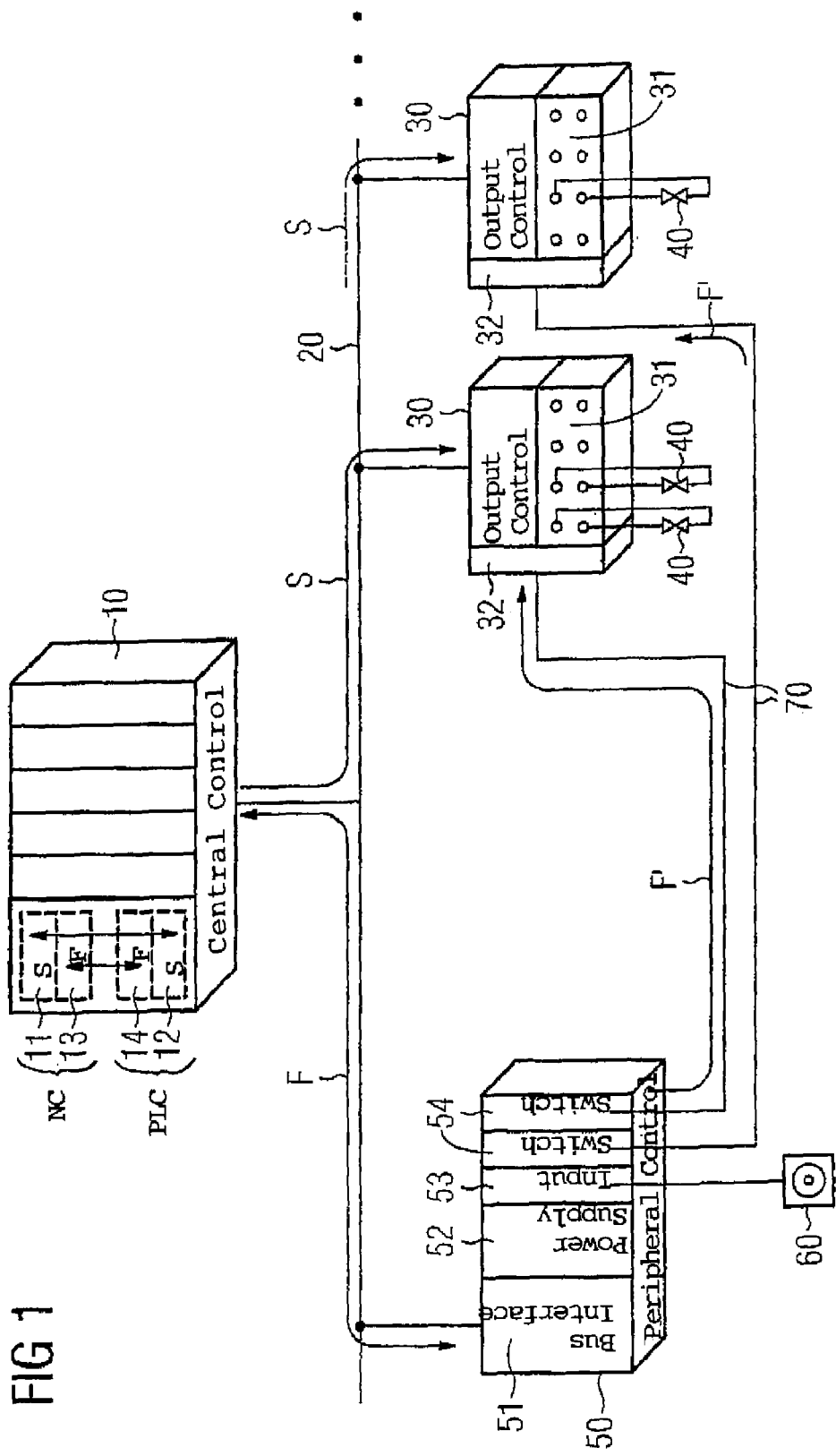
FIG. 1 shows a safety-oriented automation system.

As already described at the outset, the safety-oriented automation system 1 shown schematically in FIG. 1 essentially has a central controller 10 with PLC and NC which is connected to a plurality of output assemblies 30 and to a peripheral assembly 50 by means of a field bus 20. In this case, the peripheral assembly 50 comprises an interface module 51 for connection to the field bus 20, a power supply module 52, an input module 53 for connecting the emergency-stop command unit 60, and two load switching modules 54. In the present example, the output assemblies 30 have only valves 40 connected to them as actuators. Accordingly, it would equally be possible for contactors for disconnecting motors etc. to be connected to the output assemblies 30 as actuators, however.

In the normal operating situation for the automation system 1, the configured automation functions are performed by virtue of the connected actuators 40 being controlled using a standard bus protocol S by the standard program part 12 of the PLC and/or possibly also by the standard program part 11 of the NC.

The peripheral assembly 50 shown in FIG. 1 with the modules 51 to 54 is used for safety-oriented disconnection of the output assemblies 30 and hence to disconnect the actuators 40 in an error situation. When such an error situation arises, the initiation of the emergency-stop command unit 60 connected to the peripheral assembly 50 or else a failsafe bus protocol F communicated to the peripheral assembly 50 by the failsafe program parts 13 and 14 of the controller 10 causes the actuators 40 to be enabled by the power supply 52 and hence disconnects the actuators. The actuators 40 can thus be transferred to a safe state via the connection 70, for example by means of the signal F'=0V, so as not to present a source of danger.

To avoid such, as FIG. 1 shows, complex automation systems, particularly with different paths for transmitting the standard bus protocols S and the failsafe bus protocols F, the invention now provides an improved automation system and a corresponding input/output assembly. In this case, the inventive automation system and the corresponding input/output assembly are designed such that a simple design of an automation system is possible without substantially extending the cycle times for the routines from the standard program parts 11 and 12. Thus, the actuators 40 are disconnected on a safety-oriented basis in the simplest manner without there being any significant time delays during normal operation, that is to say during performance of the configured automation functions provided as standard.

Figure 2:
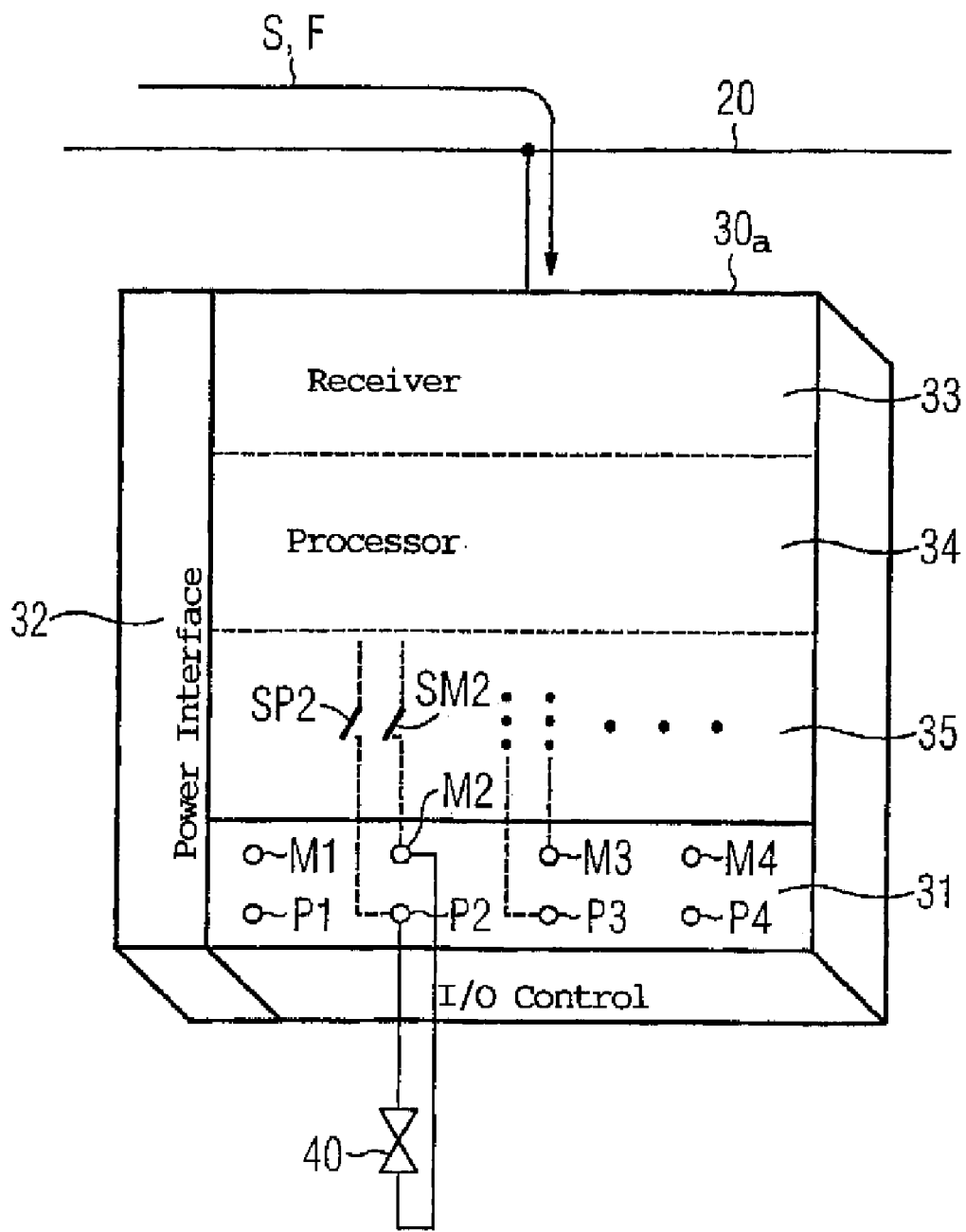
FIG. 2 shows a schematic illustration of the inventive input/output assembly as an output assembly.

FIG. 2 shows the basic design of the inventive input/output assembly 30 to which, for the purpose of simpler description of the present invention, only actuators 40 are connected, so that it is strictly a pure output assembly. A further more general form of the input/output assembly for connecting actuators and/or sensors is described in more detail with reference to FIG. 4, on the other hand.

In this case, the inventively improved output assembly 30 has various means 31, 32, 33, 34 and 35, as shown schematically in FIG. 2. The form of the means 31 for connecting one or more actuators is known. Normally, they have redundant connection pairs MP1, MP2, MP3, MP4 to which the individual actuators 40 are respectively connected. Means 32 are used as an interface to a power supply but may also themselves have a separate power supply for the output assembly.

In addition, means 33 are provided which are used as an interface to the field bus 20. With appropriate design, these means 33 could also be used as an interface for wireless transmission with the controller 10. The bus protocols received by the means 33 are forwarded, for the purpose of further handling, to the means 34 appropriately designed as a processor. Conversely, these means 33 are likewise used to handle the signals generated in the processor 34 or else the signals received from connected sensors as appropriate in order to forward them to the controller 10. The means 33 are thus used for communication between the controller 10 and the input/output assembly 30.

In addition, the input/output assembly 30 has means 35 which, together with the means 34, form the means for operating the actuators 40. In this arrangement, the means 35 may, as indicated schematically in FIG. 2, be regarded as switches . . . , SP2, SM2, . . . for switching the relevant connections . . . , P2, M2, . . . from the connection pairs MP1, MP2, MP3, MP4, which are controlled as appropriate by the means 34.

In line with the invention, the input/output assembly 30 can now be controlled both by the standard program parts 11 and 12 using a communicated standard bus protocol S and by the failsafe program parts 13, 14 using a communicated failsafe bus protocol F. To this end, the communicated bus protocols are received by the means 33 and are forwarded to the means 34 for further processing. Together with the means 35, the means 34 will then take the received bus protocol S or F as a basis for taking appropriate measures to control the connected actuators 40. The fact that, in addition, for the input/output assembly 30 a communicated and received failsafe bus protocol F has a higher priority than a correspondingly communicated standard bus protocol S means that the actuators 40 can be operated by the means 34 and 35 such that in an error situation a transmitted failsafe bus protocol F means that they can be transferred to a safe state which cannot be cancelled again by a transmitted standard bus protocol S.

In one advantageous embodiment, this prioritized disconnection of the actuators takes place in that, in an error situation, both connections M2, P2 are enabled by the means 34, 35 (positive-negative switching) and in all other situations a standard protocol S transmitted by the field bus enables only one of the connections, namely P2 (positive switching). This means that it is a very simple matter to ascertain that safety-oriented disconnection of the actuator has taken place when the switches P2 and M2 have been switched at the same time. This switching of the switch M2 cannot be reversed and hence cancelled by the standard bus protocol S, which means that in line with the invention the failsafe bus protocol's disconnection of the actuator has higher priority than switching by the standard bus protocol. In this case, both the processing of standard bus protocols and failsafe bus protocols and the prioritization thereof are preferably performed on a software basis in the means 34 and 35.

Figure 3:
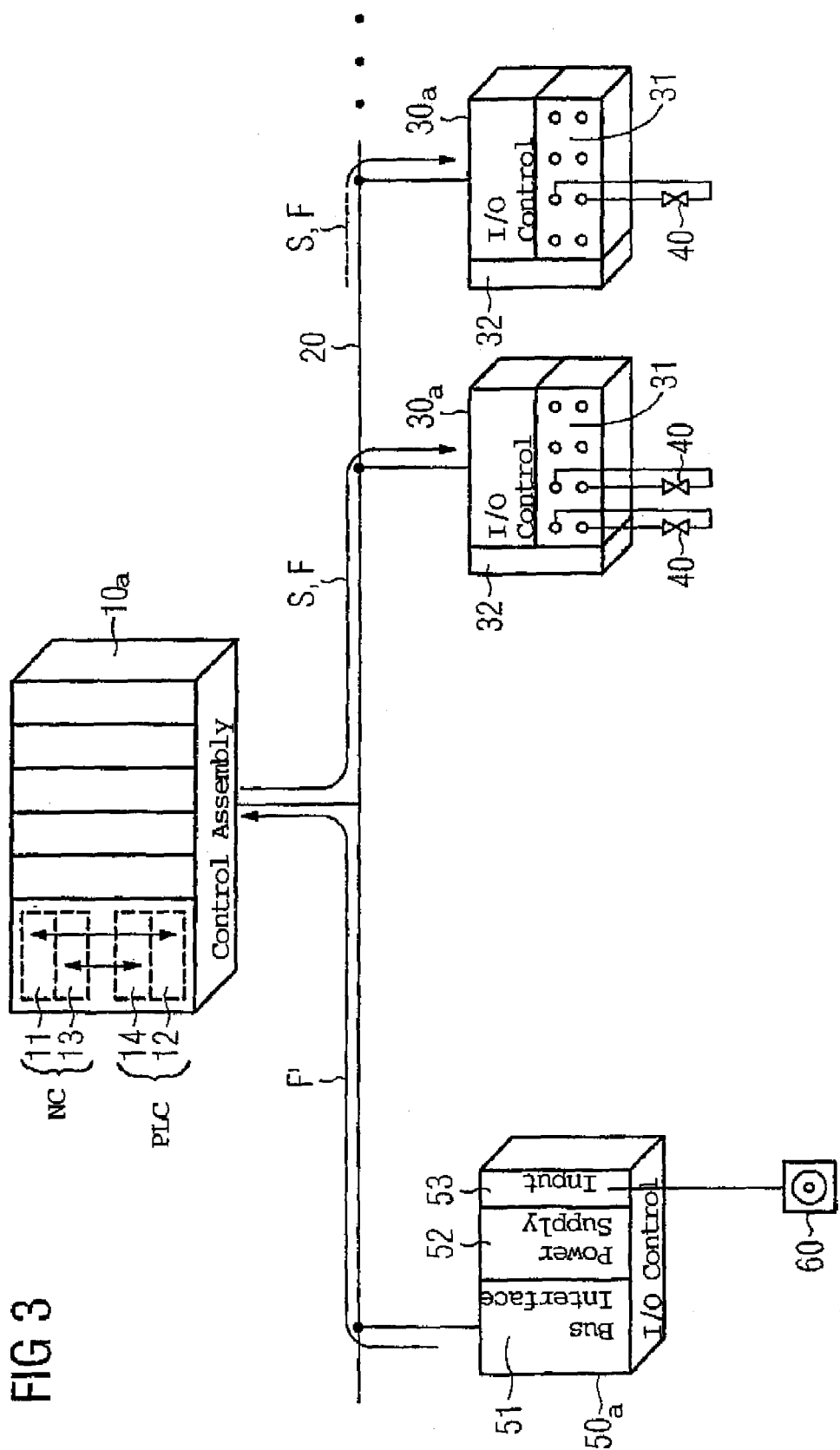
FIG. 3 shows a schematic illustration of the inventive safety-oriented automation system.

FIG. 3 shows a schematic illustration of the inventive safety-oriented automation system 1 in which the inventive input/output assembly 30 is used. As indicated in FIG. 3, the field bus 20 can now be used to transmit both the standard bus protocol S and the failsafe bus protocol F directly between the controller 10 and the input/output assembly 30. The input/output assembly 30 can therefore be addressed by both bus protocols S and F directly and can therefore communicate with the controller 10. Additional disconnection using an emergency-stop command unit 60 connected to the peripheral assembly 50 may be provided. In this case, in an error situation, that is to say when the emergency-stop command unit 60 has been operated, communication will first of all take place between the peripheral assembly 50 and the controller 10 using an appropriate bus protocol F' and, on the basis of this, a further failsafe bus protocol F is communicated from the controller 10 to the corresponding input/output assembly 30. The fact that the input/output assembly 30 can be controlled both using the standard bus protocol S and using the failsafe bus protocol F means that the standard functions can thus continue to be performed with optimum timing and, at the same time, the safety-oriented functions can be implemented without relatively great involvement. In particular, the highly involved load switching modules of the peripheral assembly are dispensed with in this inventive embodiment.

Figure 4:
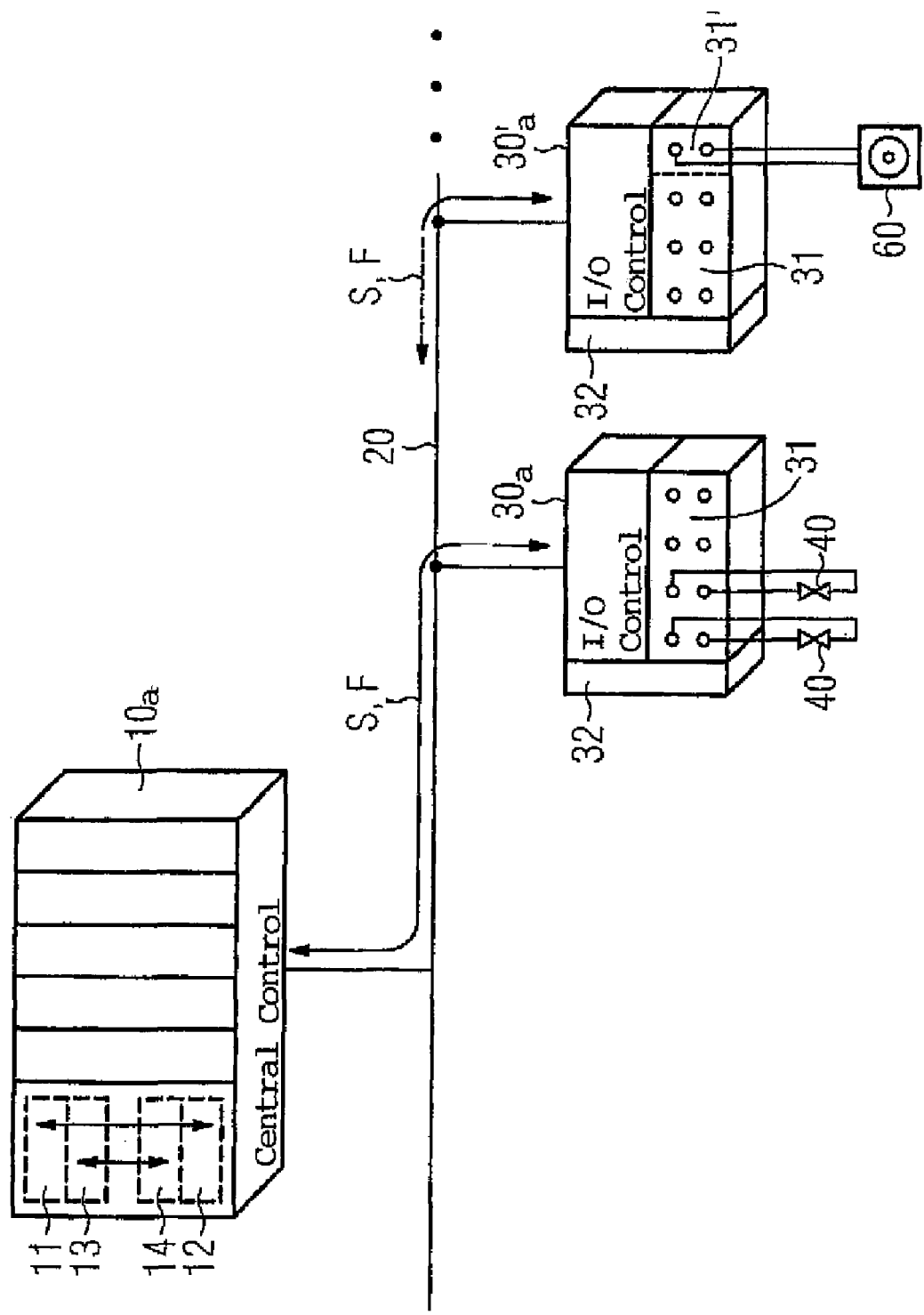
FIG. 4 shows a schematic illustration of a further form of the inventive safety-oriented automation system.

Further simplification can be achieved if the entire peripheral assembly 50 can be dispensed with. For this, as FIG. 4 shows, at least one further input/output assembly 30 must have additional means 31' for connecting sensors, such as the emergency-stop command unit 60. This input/output assembly 30 can therefore be used, as FIG. 4 shows, as a pure input assembly with sensors 60 connected to the means 31'. As indicated, an input/output assembly 30 may have both means 31 for connecting actuators and means 31' for connecting sensors, however. Communication between the actuators 40 and/or sensors 60 connected to an input/output assembly 30 and the controller 10 continues to take place by virtue of suitable conversion of the bus protocols into the actuator and sensor signals and vice versa by the means 33, 34 and 35.

The embodiments shown in FIGS. 2 to 4 are intended to explain the invention only by way of example. However, the invention also covers many other embodiments, particularly of the inventive input/output assembly too. Thus, the inventive input/output assembly can, as described beforehand, have both actuators and sensors connected to it. The fact that, in line with the invention, the input/output assembly 30 can be addressed both by a standard bus protocol S and by a failsafe bus protocol F via the field bus 20 means that individual connection pairs MP1-MP4 can also be selectively selected using these bus protocols S and F, and corresponding selective actions can be performed with individual actuators or sensors. Thus, by way of example, individual actuators can be switched on a safety-oriented basis, but other connected actuators or else sensors remain unaffected by this safety-oriented switching. Accordingly, sensors can be selectively read, etc.

What is claimed is:
1. An input/output assembly for a safety-oriented automation system, comprising:
an input receiving control signals from at least one control assembly of the automation system via a standard bus protocol and a failsafe bus protocol,
wherein control signals received by the input/output assembly using the failsafe bus protocol have a higher priority than control signals received using the standard bus protocol; and
an output having a redundant connection pair connected to an actuator via a corresponding pair of switches, wherein both switches of the redundant connection pair are released, in the event of a fault, by control signals transmitted via the failsafe bus protocol, thereby transferring the actuator to a safe state, while only one switch of the redundant connection pair is released in all other situations, and wherein the safe state cannot be cancelled by an enable signal transmitted via the standard bus protocol.

2. The input/output assembly of claim 1, further comprising a second input for connecting a sensor to the input/output assembly, said sensor providing a sensor signal to the control assembly.

3. The input/output assembly of claim 1, wherein the safe state can only be cancelled by an enable signal transmitted via the failsafe bus protocol.

4. The input/output assembly of claim 3, wherein the enable signal is provided automatically.

5. The input/output assembly of claim 3, wherein the enable signal is provided manually.

6. The input/output assembly of claim 1, having a plurality of outputs, with each of the plurality of outputs having a redundant connection pair connected to a corresponding actuator via a corresponding pair of switches, wherein the corresponding pairs of switches are selectively released by the control signals transmitted via the failsafe bus protocol, thereby transferring the selected actuator or actuators to a safe state.

7. An automation system for performing a safety-oriented automation function, said automation system comprising:

at least one control assembly having a standard program part responsive to a standard bus protocol and a failsafe program part responsive to a failsafe bus protocol;

at least one input/output assembly receiving control signals from the at least one control assembly, wherein control signals received using the failsafe bus protocol have a higher priority than control signals received using the standard bus protocol, said input/output assembly having an output having a redundant connection pair connected to an actuator via a corresponding pair of switches, wherein both switches of the redundant connection pair are released in the event of a fault transmitted via the failsafe bus protocol, transferring the actuator to a safe state, while only one switch of the redundant connection pair is released in all other situations, and wherein the safe state cannot be cancelled by an enable signal transmitted via the standard bus protocol.

8. The automation system of claim 7, further comprising a second input for connecting a sensor to the input/output assembly, said sensor providing a sensor signal to the at least one control assembly.

9. The automation system of claim 7, wherein the safe state cannot be cancelled by the input/output assembly.

10. The automation system of claim 7, wherein the at least one input/output assembly has a plurality of outputs, with each of the plurality of outputs having a redundant connection pair connected to a corresponding actuator via a corresponding pair of switches, wherein the corresponding pairs of switches are selectively released by the control signals transmitted via the failsafe bus protocol, thereby transferring the selected actuator or actuators to a safe state.

11. A method for fail-safe operating an automation system comprising the steps of:

controlling an input/output assembly with control signals transmitted via standard bus protocol and a failsafe bus protocol, said failsafe bus protocol having a higher priority than the standard bus protocol;

operating at least one actuator connected by a redundant connection pair of switches to the input/output assembly such that both switches of the redundant connection pair are released in the event of a fault by control signals transmitted via the failsafe bus protocol, thereby transferring the at least one actuator to a safe state, while only one switch of the redundant connection pair is released in all other situations, wherein the safe state cannot be cancelled by an enable signal transmitted via the standard bus protocol.

12. The method of claim 11, further comprising the step of selectively transferring the actuator to the safe state.

13. The method of claim 11, further comprising the step of connecting a sensor to the input/output assembly and providing a sensor signal to a control assembly connected upstream of the input/output assembly.

14. The method of claim 11, wherein the safe state cannot be cancelled by the input/output assembly.

15. The method of claim 11, wherein the safe state can only be cancelled by an enable signal transmitted via the failsafe bus protocol.

16. The method of claim 13, wherein the enable signal is provided automatically.

17. The method of claim 13, wherein the enable signal is provided manually.

* * * * *

UNITED STATES PATENT AND TRADEMARK OFFICE
CERTIFICATE OF CORRECTION

| | |
|---|---|
| PATENT NO. | : 7,783,915 B2 |
| APPLICATION NO. | : 11/572245 |
| DATED | : August 24, 2010 |
| INVENTOR(S) | : Ronald Hauf |

It is certified that error appears in the above-identified patent and that said Letters Patent is hereby corrected as shown below:

On the title page,

(56) Cited References

FOREIGN PATENT DOCUMENTS

Line 2: replace "DE 199 26517 A1" with -- DE 199 28 517 A1 --.

Signed and Sealed this

Ninth Day of November, 2010

David J. Kappos
*Director of the United States Patent and Trademark Office*